United States Patent
Yoshimoto et al.

(10) Patent No.: US 7,656,689 B2
(45) Date of Patent: Feb. 2, 2010

(54) POWER CONVERTER AND CONTROL METHOD FOR A POWER CONVERTER USING SERIALLY-CONNECTED DC POWER SOURCES

(75) Inventors: Kantaro Yoshimoto, Yokohama (JP); Yasuhiko KitaJima, Kamakura (JP)

(73) Assignee: Nissan Motor Co., Ltd., Yokohama, Kanagawa (JP)

( * ) Notice: Subject to any disclaimer, the term of this patent is extended or adjusted under 35 U.S.C. 154(b) by 576 days.

(21) Appl. No.: 10/573,768

(22) PCT Filed: Oct. 20, 2005

(86) PCT No.: PCT/IB2005/003127

§ 371 (c)(1),
(2), (4) Date: Mar. 29, 2006

(87) PCT Pub. No.: WO2006/061679

PCT Pub. Date: Jun. 15, 2006

(65) Prior Publication Data

US 2008/0238200 A1 Oct. 2, 2008

(30) Foreign Application Priority Data

Oct. 21, 2004 (JP) ............................. 2004-306547

(51) Int. Cl.
*H02M 7/5387* (2007.01)
(52) U.S. Cl. .......................................... 363/71; 363/98
(58) Field of Classification Search .................. 363/71, 363/98, 132
See application file for complete search history.

(56) References Cited

U.S. PATENT DOCUMENTS

| 4,443,841 | A | | 4/1984 | Mikami et al. |
| 4,670,828 | A | * | 6/1987 | Shekhawat et al. ....... 363/56.04 |
| 4,894,621 | A | * | 1/1990 | Koenig et al. ............... 330/251 |
| 6,031,738 | A | | 2/2000 | Lipo et al. |
| 7,122,991 | B2 | * | 10/2006 | Kitajima et al. ............. 318/800 |
| 2002/0048181 | A1 | * | 4/2002 | Kobayashi et al. ............ 363/71 |
| 2007/0216338 | A1 | * | 9/2007 | Yoshimoto et al. .......... 318/800 |

FOREIGN PATENT DOCUMENTS

| EP | 1 615 325 A2 | 1/2006 |
| JP | 2002-118981 | 4/2002 |
| WO | WO2005/119897 | * 12/2005 |

* cited by examiner

*Primary Examiner*—Jeffrey L Sterrett
(74) *Attorney, Agent, or Firm*—Young Basile

(57) ABSTRACT

A control method for a power converter capable of reducing overall volume of a system and energy loss by using a plurality of power sources and distributing loads to them without a DCDC converter. The power converter has DC power sources and poles formed by connecting various poles of the DC sources. Voltage is applied to a load by switching between poles. The method includes operating a switch between poles of the first DC power source when a voltage command is lower than the electric potential of the second DC power source; and operating a switch between the poles of the second DC source when the voltage command is higher than the electric potential of the second DC source.

18 Claims, 6 Drawing Sheets

POWER CONVERTER AND CONTROL METHOD FOR A POWER CONVERTER USING SERIALLY-CONNECTED DC POWER SOURCES

CROSS-REFERENCE TO RELATED APPLICATIONS

The present application claims priority under 35 U.S.C. §119 of Japanese Patent Application No. 2004-306547, filed on Oct. 21, 2004, the entire content of which is expressly incorporated by reference herein.

FIELD

The present invention relates to a power converter and a control method for a power converter.

BACKGROUND

A constitution for driving a motor with a high efficiency using a fuel cell as the main power source is disclosed as prior art in Publication of Unexamined Japanese Patent Application No. 2002-118981. In this example, a battery is connected to the fuel cell in parallel via a DCDC converter with the intent of improving the output efficiency of the power source by controlling the DCDC converter's output voltage.

However, the total volume of the system including the power source, the power converter, and the motor is large because of the use of the DCDC converter, and the system generates a loss when charging and discharging the battery because of routing through the DCDC converter.

SUMMARY

The purpose of the present invention is to provide a power converter and a control method for a power converter that is capable of reducing the overall volume of the system and energy loss by using a plurality of power sources and distributing loads to the power sources without routing though a DCDC converter.

In order to solve the abovementioned problems, the control method for a power converter according to a embodiment of the present invention is:

a control method for an electric power converter that comprises first and second DC power sources, and a pole formed by connecting the positive pole of said first DC power source with the negative pole of said second DC power source, wherein voltage is applied to a load (e.g., motor) by switching between the negative pole of said first DC power source and the positive pole of said second DC power source; said method characterized by comprising:

a step for determining conductivity of a switch between the positive and negative poles of said first DC power source when the voltage command is lower than the electric potential output by said second DC power source;

a step for determining conductivity of a switch between the positive and negative poles of said second DC power source when the aforementioned voltage command is higher than the electric potential output by said second DC power source; and a step for switching the pole to be connected to said load in accordance with the aforementioned determining steps.

DETAILED DESCRIPTION

A detailed explanation of the most preferable embodiment of the present invention will be provided below with reference to the accompanying drawings.

Circuit Diagram

Figure 1:
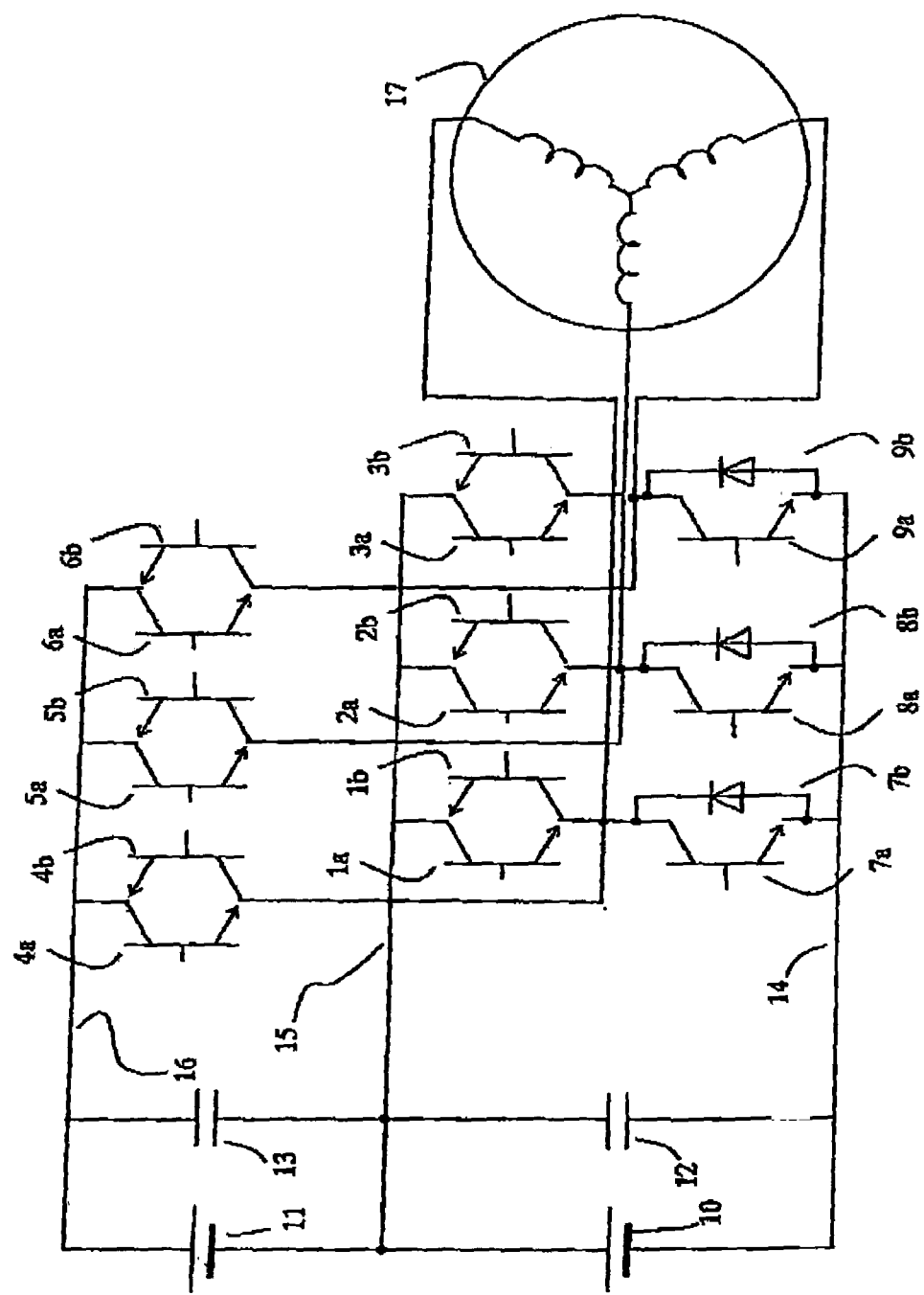
FIG. 1 is a circuit diagram of an electric power converter that is suitable for application of the control method for the electric power converter according to an embodiment of the present invention.

FIG. 1 is a circuit diagram of an electric power converter that is suitable for applying the control method for the electric power converter for the present invention. The negative pole of second DC power source 11 and the positive pole of first DC power source 10 are connected to common bus line 15 to form a pole. A group of semiconductor switches 7a/8a/9a and a group of diodes 7b/8b/9b are connected between negative pole bus line 14 of the first DC power source 10 and the terminal of each phase of three-phase AC motor (load) 17 in a similar manner as the lower arms of a commonly known three-phase inverter. Common bus line 15 is connected to the terminal of each phase of three-phase AC motor 17 by semiconductor switches, 1a/1b, 2a/2b, and 3a/3b respectively, which are capable of controlling bi-directional conductance. Also, positive bus line 16 of the second DC power source 11 is connected to the terminal of each phase of three-phase AC motor 17 by semiconductor switches, 4a/4b, 5a/5b, and 6a/6b respectively, which are capable of controlling bi-directional conductance.

Smoothing capacitor 12 is provided between negative pole bus line 14 of the first DC power source 10 and common bus line 15, and smoothing capacitor 13 is provided between positive pole bus line 16 of the second DC power source 11 and common bus line 15. Three-phase AC motor 17 is connected to the power converter as the load.

The electric potential of the output terminals of the power converter thus constituted can be considered as described below, assuming the voltage of the first DC power source 10 as E1, the voltage of the second DC power source 11 as E2, and giving particular reference to the U-phase terminals.

Figure 2:
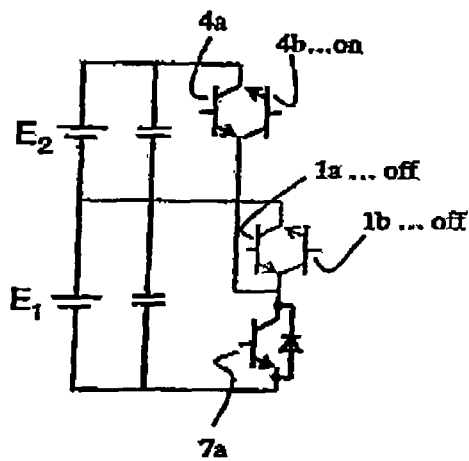
FIGS. 2-4 are circuit diagrams showing each ON/OFF status of the switches of the U-phase of the circuit diagram shown in FIG. 1.
Figure 3:
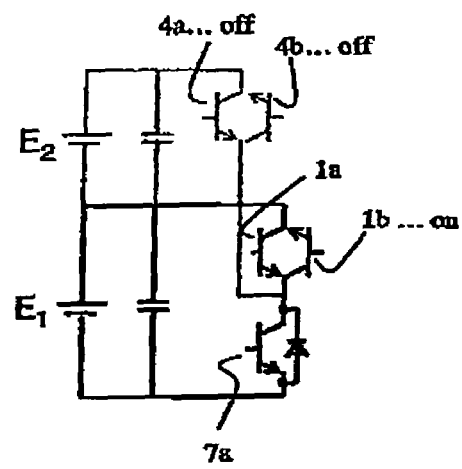
Figure 4:
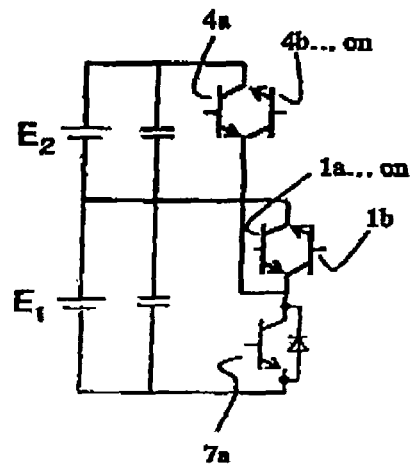

FIG. 2, FIG. 3, and FIG. 4 are circuit diagrams each showing the temporary ON/OFF status of the switches for only the U-phase of the circuit diagram shown in FIG. 1. FIG. 2 shows the status in which 1a/1b are both OFF and in which 4b is ON. In this case, the electric potential of terminal 21 of the U-phase can be operated similar to an inverter that operates with the ON/OFF switching of switches 4a and 7a based on DC power sources E1+E2 created by serially connecting the two power sources.

FIG. 3 shows the status in which 4a/4b are turned OFF and 1b is turned ON. In this case, the electric potential of terminal 21 of the U-phase can be operated similar to an inverter that operates with the ON/OFF switching of switches 1a and 7a based on DC power source E1.

FIG. 4 shows the status in which 7a is turned OFF and 1a/4b are turned ON. In this case, the electric potential of terminal 21 of the U-phase can be operated similar to an inverter that operates with the ON/OFF switching of switches 1b and 4a based on DC power source E2.

These operations can be conceived for terminals of other phases, so that the motor can be driven using two power sources simultaneously or using only one of them.

Motor Controller and Power Distribution Controller

The drive signal that turns each switch ON or OFF for the power converter shown in FIG. 1 is generated in accordance with the torque signal from the motor and the power distribution command for allocating the power required for driving the motor between the two power sources.

Figure 7:
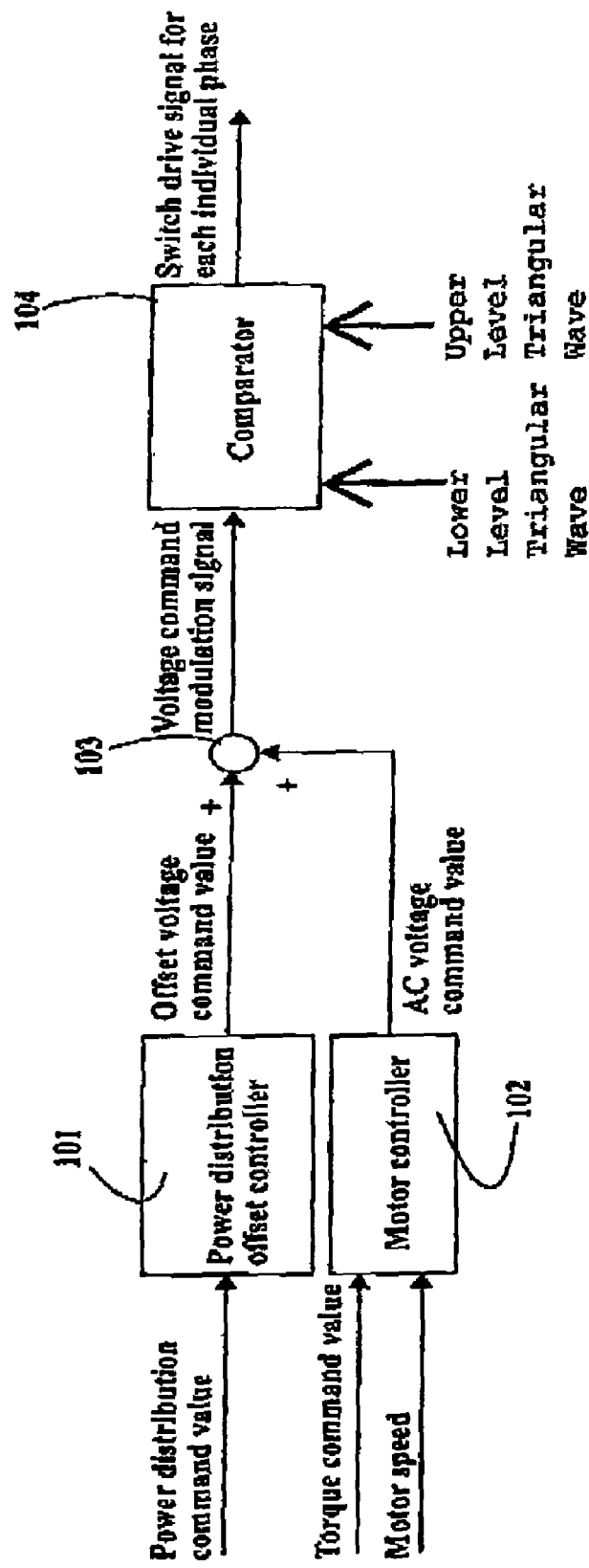
FIG. 7 is a control block diagram showing the various processes for the electric power converter shown in FIG. 1.

FIG. 7 is the control block diagram showing these processes for the power converter shown in FIG. 1. A commonly known vector control method is used for the detail of the constitution of motor controller 102, which is used to calculate the AC voltage to be applied to the motor based on the motor torque command and the motor rotating speed. The motor control voltage of the three-phase AC motor is calculated as a three phase AC voltage command value.

On the other hand, power distribution offset controller 101 calculates the offset voltage command value that realizes the power distribution based on the power distribution command values of the two power sources. The offset voltage command value can be obtained from the power distribution command and the torque command value, or by inputting the motor rotation speed and referencing the table of the offset voltage command values. The voltage distribution command value is a command value for controlling the electric charge/discharge volume by adjusting the distribution of the output power at the charging state when the two power sources are batteries, for example.

The AC voltage command and the offset voltage command are added at adder 103 to provide a voltage command value modulation signal, which is then input to comparator 104.

Operation of the Comparator

Figure 5:
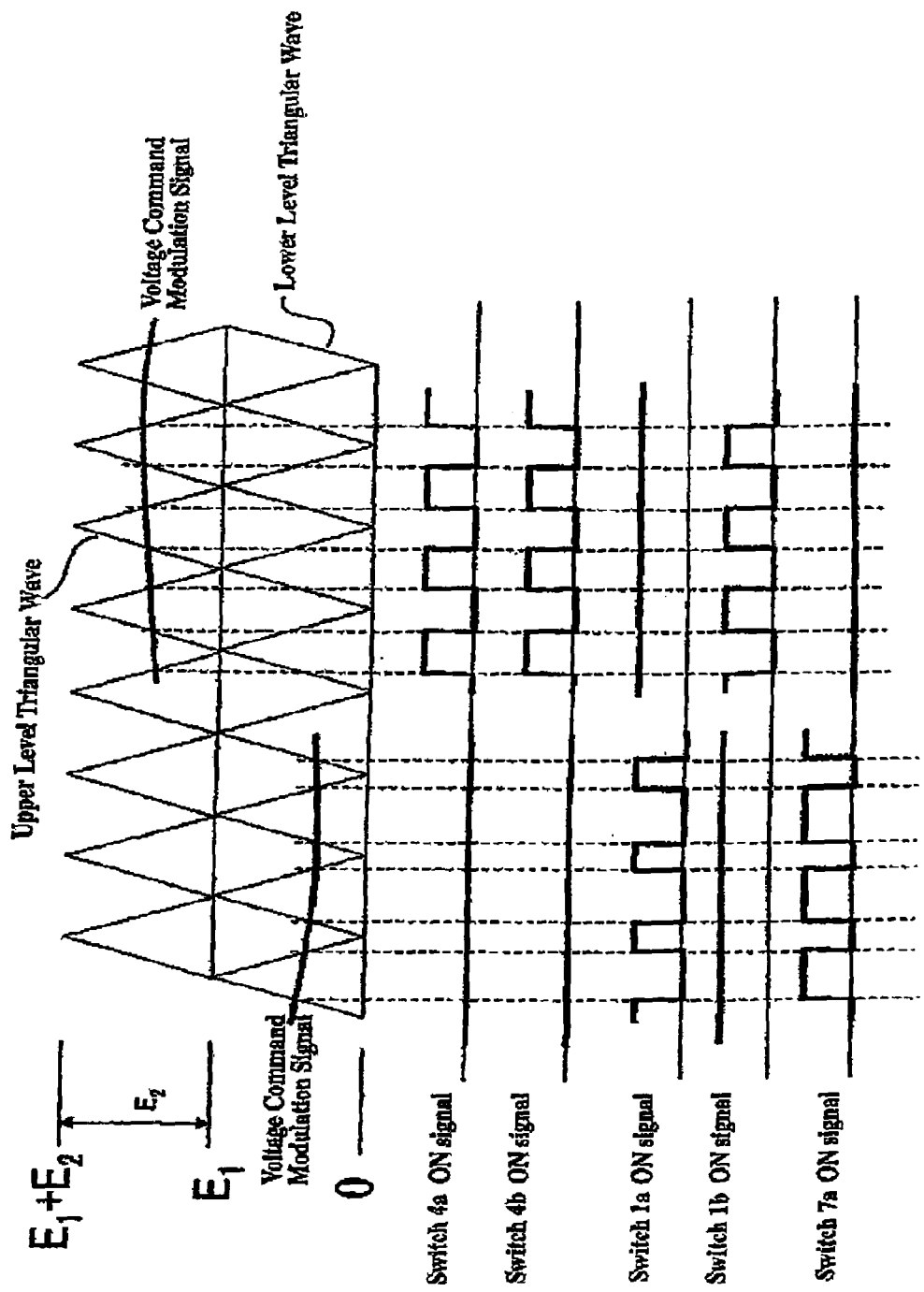
FIG. 5 is a timing chart showing the switches of the U-phase switch ON/OFF actions due to the triangular wave comparison of the voltage command modulation signal.

The operation of comparator 104 is described in detail below. FIG. 5 is a timing chart showing the U-phase switch ON/OFF actions due to triangular wave comparison of the voltage command modulation signal. As shown in FIG. 5, comparator 104 has an upper level triangular wave and a lower level triangular wave with a 180-degree difference in phase, and the amplitude of the lower level triangular wave is equal to the voltage E1 of the first DC power source 10, while the amplitude of the upper level triangular wave is equal to the voltage E2 of the second DC power source 11. The base of the triangular wave and the apex correspond to the electrical potentials of the pole bus lines 14, 15, 16 shown in FIG. 1. The upper and lower level triangular waves can perform similar electrical potential switching actions without having to have a phase difference between them.

Figure 8:
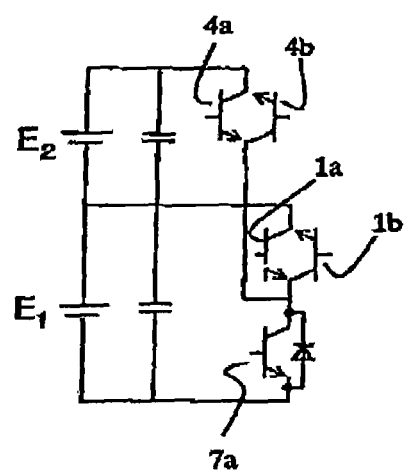
FIG. 8 is a circuit diagram with particular reference to only the U-phase of the electric power converter according to an embodiment of the present invention.

FIG. 8 is a circuit diagram with particular reference to only the U-phase of the electric power converter according to an embodiment of the present invention. In other words, it shows only the switches of the U-phase for the circuit diagram shown in FIG. 1, and the switch ON/OFF statuses are executed according to the concept described below based on the comparison of the triangular waves.

First, consider a case in which the inverter circuit constituted only of the first DC power source 10 is driven in accordance with the comparison between the lower level triangular wave and the voltage command modulation signal. Switch 1b is ON and switch 4a is OFF, while the ON/OFF statuses of switches 1a and 7a are determined as follows:

When the voltage command modulation signal < (is less than) the lower level triangular wave 1a=OFF/7a=ON 1b=ON 4a=OFF 4b=OFF When the voltage command modulation signal > (is greater than or equal to) the lower level triangular wave 1a=ON/7a=OFF 1b=ON 4a=OFF 4b=OFF Next, consider a case in which the inverter circuit constituted only of the second DC power source 11 is driven in accordance with the comparison between the upper level triangular wave and the voltage command modulation signal. Switch 1a is ON and switch 7a is OFF, while the ON/OFF statuses of switches 1b and 4a are determined as follows:

When the voltage command modulation signal < (is less than) the upper level triangular wave 4a=OFF/1b=ON 4b=OFF 1a=ON 7a=OFF When the voltage command modulation signal > (is greater than or equal to) the upper level triangular wave 4a=ON/1b=OFF 4b=ON 1a=ON 7a=OFF Combining the above two triangular wave comparisons, the following switch selection is obtained:

When the voltage command modulation signal < (is less than) the lower level triangular wave 1a=OFF/7a=ON 1b=ON 4a=OFF 4b=OFF When the lower level triangular wave < (is less than) the voltage command modulation signal < (is less than) the upper level triangular wave 1a=ON/7a=OFF 1b=ON 4a=OFF 4b=OFF When the voltage command modulation signal ≧ (is greater than or equal to) the upper level triangular wave 1a=ON/7a=OFF 1b=OFF 4a=ON 4b=ON FIG. 5 shows the ON/OFF actions of these U-phase switches. In FIG. 5, when the ON signal is high, the related switch turns on.

Comparison with the Voltage Command on which the Offset Command is Superimposed (When Only the First Power Source is Used)

Figure 6:
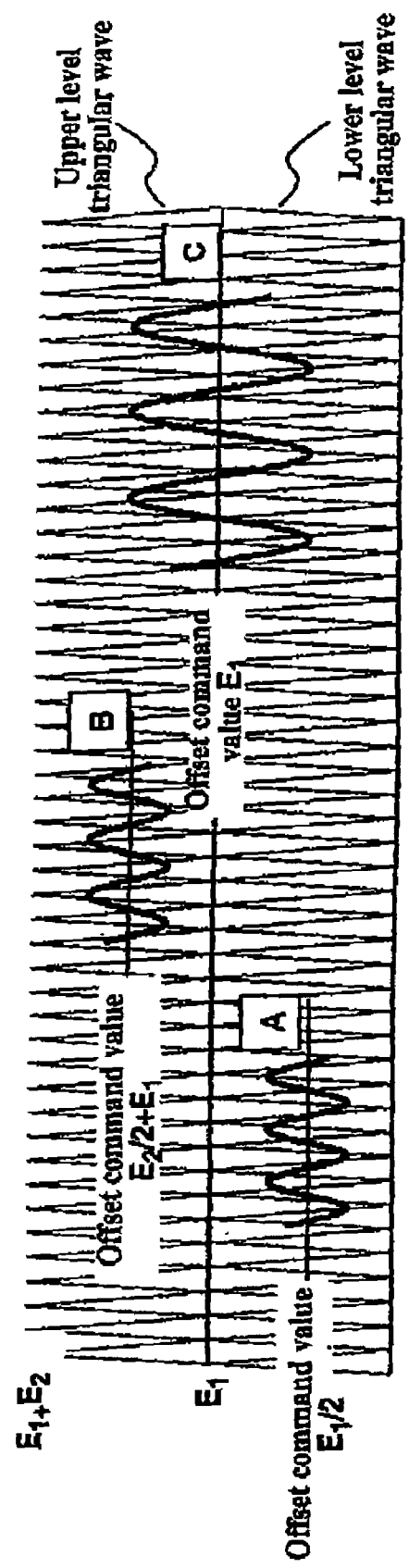
FIG. 6 is a timing chart showing an example of the triangular wave comparison of the voltage command modulation signal.

FIG. 6 is a timing chart showing an example of a comparison between the triangular wave and the voltage command modulation signal to which is added an offset voltage command value. For reference character A in FIG. 6, the offset voltage command value is one half of the first DC power source voltage $E_1$, so that the voltage command modulation signal is compared only with the lower level triangular wave if the amplitude of the AC voltage command value is smaller than $E_1/2$.

Since switches 4a/4b are turned OFF in this case, the output power of the second DC power source is 0, and the power distribution ratio is as follows:

The first DC power source: the second DC power source=100:0.

For reference character B in FIG. 6, the offset voltage command value is a sum of the first DC power source voltage $E_1$ and one half of the second DC power source voltage $E_2$, so that the voltage command modulation signal is compared only with the upper level triangular wave if the amplitude of the AC voltage command value is smaller than $E_2/2$.

Since switch 7a is turned OFF in this case, the output power of the first DC power source is 0, and the power distribution ratio is as follows:

The first DC power source: the second DC power source=0:100.

For reference character C in FIG. 6, the offset voltage command value is the DC power source voltage $E_1$. The voltage command modulation signal is compared with the upper/lower level triangular waves. Since the areas surrounded by the compared voltage command modulation signal and the offset command value are equal between the upper and lower levels, the power source voltages of the upper and lower levels will be equal if the motor phase current is a sinusoidal wave with no offset. In other words, The first DC power source: The second DC power source=50:50.

Thus, the power distribution ratio of the first DC power source and the second DC power source can be manipulated by adjusting the offset voltage command value. In other words, according to an embodiment of the present invention, the power distribution of the two power sources can be arbitrarily adjusted using a combination of the switches of the electric power converter consisting of semiconductor switches, without using a DCDC converter.

Moreover, if the offset voltage command value is set to one half of the sum of the first DC power source voltage $E_1$ and the second DC power source voltage $E_2$, the upper limit of the compared voltage amplitude is $E_1+E_2$, so that the motor can be driven by the sum of the two power source voltages.

Furthermore, if the motor rotating speed is increased, the motor's induction voltage increases accordingly, so that the terminal voltage to be applied to the motor must be increased with the increase of the rotating speed in order to output the same motor torque. For such a demand in the voltage increase, although a method for increasing it using a DCDC converter is known, such a method also increases the loss in the inductance and semiconductor elements and also increases the volume of the system.

In contrast, a control method for the electric power converter that pertains to the present invention drives the motor by using a voltage generated by adding the voltages of the two power source voltages so that the output range can be expanded without the use of a DCDC converter. Therefore, by using this method, it becomes possible to reduce the loss and the volume of the system.

Although various drawings and embodiments are used in the aforementioned description of the present invention, it should be noted here that a person skilled in the art could easily make various modifications and alterations based on the present disclosure. Therefore, it should be noted that all of such modifications and alterations are included in the claims of the present invention. For example, it is explained in the aforementioned embodiments that the carrier is a triangular wave and generates a symmetric voltage waveform containing high harmonic components of odd number orders. Since a three-phase AC motor does not affect the current, even if high harmonic components of 3n orders are contained in the voltage, it is possible to reduce the effect of the high harmonic current of the load by using a symmetric voltage waveform containing high harmonic components of odd number orders, but waveforms other than a triangular waveform such as a saw blade waveform can be used as the carrier if the voltage symmetry is negligible.

CONCLUSION

The invention embodiments provide a power converter and a control method for a power converter that is capable of reducing the overall volume of the system and energy loss by means of using a plurality of power sources and distributing loads to the power sources without routing though a DCDC converter One embodiment provides a control method for an electric power converter that has first and second DC power sources 10 and 11 and a pole 15 formed by connecting the first DC power source's positive pole 16 with the second DC power source's negative pole 14. A voltage is applied to a load (e.g., motor 17) by switching between the first DC power source's negative pole and the second DC power source's positive pole 16. This method includes operating a switch between the positive and negative poles of the first DC power source when the voltage command is lower than the electric potential output by the second DC power source; and operating a switch between the positive and negative poles of the second DC power source when the voltage command is higher than the electric potential output by the second DC power source. This switches the pole to be connected to the load.

According to an embodiment of the present invention, the distribution of the output power of two DC power sources can be arbitrarily manipulated in accordance with the voltage command by selectively applying a voltage to the terminal to be connected to the load from each pole consisting of the two connected DC power sources. The distribution of such an output voltage has hitherto required an electric power converter, such as a DCDC converter, in addition to a power converter that supplied power to the load. According to the embodiment of the present invention, electric power can be distributed by simply switching connections between the poles of the power sources and the load, so that fewer elements that may cause loss in the current flow passage are required, and the loss between the power source and the load is minimized. Since a power converter, such as a DCDC converter, is not needed, the overall system can be made smaller. In addition, the sum of the voltages of the two connected power sources as well as the voltage of each power source can be applied to a terminal. This makes it possible to apply a higher voltage by combining the voltages of the two power sources, if desired, in order to increase the range of voltage to be applied to the load.

Furthermore, in another embodiment of the present invention, when selecting a terminal to be connected to the load from each of the poles, consisting of two connected DC power sources based on the voltage command, it is possible to arbitrarily manipulate the distribution of the output voltages of the two DC power sources while applying the voltage generated by pulse width modulation (PWM) to the load by applying voltage based on the result of the comparison between the carrier and the voltage command. This not only allows for a reduction of elements that cause loss in the current passage from the power source to the load, but also reduces the higher harmonic current by means of PWM, thus minimizing the overall loss in the system.

Furthermore, according to another embodiment, it is possible to disconnect the connection between a pole and the load by using a switch that makes it possible to select bi-directional conductance between the positive pole bus line and the terminal that connects with the load when selecting the terminal to be connected to the load from each of the poles consisting of two connected DC power sources based on the voltage command. This increases the selectivity of the potential compared to when a combination of a switching element and a diode are used in the same location. This makes it possible to arbitrarily select the voltage to be applied to the load, thus making it possible to suppress the higher harmonic current and reduce the loss.

Furthermore, according to another embodiment of the present invention, it is possible to provide guidance as to which switch of the pole bus line should be turned ON or OFF based on the comparison between the carrier and the voltage command, since the carrier and the bus line electrical potential are in a corresponding relation. This makes it possible to easily generate the PWM signal for turning the switch ON or OFF.

Furthermore, according to another embodiment of the present invention, it is possible to have a symmetric voltage waveform containing higher harmonic components of odd number orders for the voltage to be applied to the load by choosing a triangular wave for the carrier. So, for example, even if an electric power converter that applies a three-phase AC voltage and its load contain higher harmonic components of 3n orders, this will not affect the current. Thus, use of a symmetric voltage waveform containing higher harmonic components of odd number orders can reduce the effects of the higher harmonic current of the load.

Furthermore, according to another embodiment of the present invention, the load voltage can be adjusted by the electric power converter while manipulating the output power distribution of the two DC power sources by operating the switch of the electric power converter based on the voltage command generated by adding the power distribution command and the voltage command. This makes the use of a power-converter for controlling the power distribution, such as a DCDC converter, unnecessary.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed:

1. A control method for an electric power convener that comprises first and second DC power sources, wherein a pole is formed by connecting a positive pole of the first DC power source with a negative pole of the second DC power source, and voltage is applied to a load by operating switches between a negative pole of the first DC power source and a positive pole of the second DC power source, the method comprising:
    generating a voltage command indicative of a voltage to be applied to the load; and
    switching a pole to be connected to the load by:
        operating a switch between the positive and the negative poles of the first DC power source when the voltage command is lower than an electric potential of the negative pole of the second DC power source; and
        operating a switch between the positive and the negative poles of the second DC power source when the voltage command is higher than the electric potential of the negative pole of the second DC power source.

2. A control method for an electric power converter described in claim 1, further comprising:
    setting a lower limit of a lower carrier to an electric potential of the negative pole of the first DC power source;
    setting an upper limit of the lower carrier and a lower limit of an upper carrier to an electric potential of a pole formed by connecting the positive pole of the first DC power source with the negative pole of the second DC power source; and
    setting an upper limit of the upper carrier to the an electric potential of the positive pole of the second DC power source.

3. A control method for an electric power converter described in claim 2 wherein the lower carrier and the upper carrier are triangular waves.

4. A control method for an electric power converter described in claim 1, further comprising:
    generating a power distribution command based on a desired power distribution for at least the first and the second DC power sources; and
    generating an AC voltage command based on the load; and
    wherein generating the voltage command includes adding the AC voltage command to the power distribution command.

5. A control method for an electric power converter that comprises first and second DC power sources, wherein a pole is formed by connecting a positive pole of the first DC power source with a negative pole of the second DC power source, and voltage is applied to a load by operating switches between a negative pole of the first DC power source and a positive pole of the second DC power source, the method comprising:
    generating a voltage command indicative of a voltage to be applied to the load; and
    switching a pole to be connected to the load by:
        operating a switch between the positive and the negative poles of the first DC power source by comparing the voltage command with a lower carrier; and
        operating a switch between the positive and the negative poles of the second DC power source by comparing the voltage command with an upper carrier.

6. A control method for an electric power converter described in claim 5, further comprising:
    setting a lower limit of the lower carrier to an electric potential of the negative pole of the first DC power source;
    setting an upper limit of the lower carrier and a lower limit of the upper carrier to an electric potential of a pole formed by connecting the positive pole of the first DC power source with the negative pole of the second DC power source; and
    setting an upper limit of the upper carrier to an electric potential of the positive pole of the second DC power source.

7. A control method for an electric power converter described in claim 5 wherein the lower carrier and the upper carrier are triangular waves.

8. A control method for an electric power converter described in claim 5, further comprising:
    generating a power distribution command based on a desired power distribution between at least the first and the second DC power sources; and
    generating an AC voltage command based on the load; and
    wherein generating the voltage command includes adding the AC voltage command to the power distribution command.

9. A control method for an electric power converter having first and second DC power sources, a common pole formed by connecting a positive pole of the first DC power source and a negative pole of the second DC power source to a common bus line, a first switching element provided between a negative pole of the first DC power source and an output terminal of a load to provide conductance from the output terminal to a negative pole of the first DC power source, a first diode connected in parallel with the first switching element, a first bi-directional switch provided for selecting bi-directional conductance between the output terminal and the common bus line, and a second bi-directional switch provided for selecting bi-directional conductance between the output terminal and a positive pole of the second DC power source, the method comprising:

generating a voltage command indicative of a voltage to be applied to the load; and switching a pole to be connected to the load by:

operating a switch between the positive pole and the negative pole of the first DC power source by comparing the voltage command with a lower carrier; and operating a switch between the positive pole and the negative pole of the second DC power source by comparing the voltage command with an upper carrier.

10. A control method for an electric power converter described in claim 9, further comprising:

setting a lower limit of the lower carrier to the an electric potential of the negative pole of the first DC power source;

setting an upper limit of the lower carrier and a lower limit of the upper carrier to an electric potential of the common pole; and setting an upper limit of the upper carrier to an electric potential of the positive pole of the second DC power source.

11. A control method for an electric power converter described in claim 10 wherein the lower carrier and the upper carrier are triangular waves.

12. A control method for an electric power converter described in claim 9, further comprising:

generating a power distribution command based on a desired power distribution between at least the first and the second DC power sources; and generating an AC voltage command based on the load; wherein generating the voltage command includes adding the AC voltage command to the power distribution command.

13. A power converter for supplying power to a three-phase load, comprising:

a first DC power source;

a second DC power source;

a common bus line connected to a positive pole of the first DC power source and to a negative pole of the second DC power source;

a first plurality of semiconductor switches connected between a negative pole of the first DC power source and each of three terminals of the three-phase load;

a second plurality of semiconductor switches connected between the common bus line and each of the three terminals of the three-phase load;

a third plurality of semiconductor switches connected between a positive pole of the second DC power source and each of the three terminals of the three-phase load;

a voltage command generating portion configured to generate a voltage command indicative of a voltage to be applied to each of the three terminals of the three-phase load; and a switch control portion configured to switch a pole to be connected to the three-phase load by operating a switch connected between the positive pole and the negative pole of the first DC power source when the voltage command is lower than an electric potential of the negative pole of the second DC power source and operating a switch connected between the positive pole and the negative pole of the second DC power source when the voltage command is higher than the electric potential of the negative pole of the second DC power source.

14. A power converter of claim 13, wherein the switch control portion is further configured to operate the switch connected between the positive pole and the negative pole of the first DC power source by comparing the voltage command and the lower carrier, and to operate the switch connected between the positive pole and the negative pole of the second DC power source by comparing the voltage command and the upper carrier.

15. A power converter of claim 14, wherein a lower limit of the lower carrier is set to an electric potential of the negative pole of the first DC power source, an upper limit of the lower carrier and a lower limit of the upper carrier are set to an electric potential of the common bus line, and an upper limit of the upper carrier is set to an electric potential of the positive pole of the second DC power source.

16. A power converter of claim 14, wherein the lower carrier and the upper carrier are triangular waves.

17. A power converter of claim 13, wherein each of the second and the third plurality of semiconductor switches comprises switch pairs for controlling bi-directional conduction.

18. A power convener of claim 13, and further comprising:

a power distribution command generating portion configured to generate a power distribution command based on a desired power distribution between the first and second DC power sources, wherein the voltage command is based on addition of the power distribution command and an AC voltage command based on the load.

* * * * *